US012706446B1

(12) United States Patent
Herth

(10) Patent No.: US 12,706,446 B1
(45) Date of Patent: Aug. 11, 2026

(54) FAN/FIXTURE BOX AND ADJUSTABLE BRACE WITH MULTIPLE FOOTPRINT MOUNTING BLOCKS

(71) Applicant: Greg Herth, Oakdale, NY (US)

(72) Inventor: Greg Herth, Oakdale, NY (US)

( * ) Notice: Subject to any disclaimer, the term of this patent is extended or adjusted under 35 U.S.C. 154(b) by 0 days.

(21) Appl. No.: 19/301,418

(22) Filed: Aug. 15, 2025

Related U.S. Application Data

(60) Provisional application No. 63/826,643, filed on Jun. 19, 2025.

(51) Int. Cl.
*H02G 3/08* (2006.01)
*F16M 13/02* (2006.01)

(52) U.S. Cl.
CPC .......... *H02G 3/081* (2013.01); *F16M 13/027* (2013.01)

(58) Field of Classification Search
CPC ............................. H02G 3/081; F16M 13/027
USPC ...................................... 248/595, 644, 200.1
See application file for complete search history.

(56) References Cited

U.S. PATENT DOCUMENTS 1,892,286 A * 12/1932 Nyberg .................. H02G 3/126 174/63
2,140,861 A * 12/1938 Steketee ................ H02G 3/126 220/3.9
2,293,168 A * 8/1942 Pirone .................... A47H 1/022 211/105.4
2,528,418 A 10/1950 Buckels
2,713,983 A 7/1955 Kay
2,917,263 A 12/1959 Appleton
3,518,421 A 6/1970 Cogdill
4,391,428 A * 7/1983 Grimes .................. F24F 13/32 248/57

(Continued)

FOREIGN PATENT DOCUMENTS

CN 205724736 U 11/2016
WO 0101033 A1 1/2001

OTHER PUBLICATIONS

Steel fan and fixture box with adjustable mounting bracket for existingconstruction. Adjusts from 16" to 24" on center spacing. 2" deep box. 20.0 cu.in. (accessed Jun. 22, 2025) https://www.aifittings.com/catalog/fan-fixture-boxes/steel-fan-and-fixture-box-with-adjustable-mounting-bracket-for-existing-construction/FBRS4200R Discloses an adjustable fan and fixture securement with spikes.

(Continued)

*Primary Examiner* — Muhammad Ijaz
(74) *Attorney, Agent, or Firm* — Alfred M. Walker; Thomas A. O'Rourke; James Bongiorno

(57) ABSTRACT

A fan/fixture box and adjustable brace for a ceiling fan electrical work box, in old work environments, includes a fan/fixture box and adjustable brace with a threaded rod. The adjustable brace has opposite mounting blocks at either end and a saddle brace which is inserted over and into the ceiling fan electrical box. The stable fan/fixture box and adjustable brace includes a pair of rectangular opposite end mounting blocks being configured with four sides, where the normally bottom edge has a predetermined fixed distance from a midpoint of a hole for said threaded rod, which said predetermined fixed distance is equal to the distance from the left and right-side edges, also in an equal distance from the hole for a wherein if one end mounting block topples over on its side edge, the threaded rod and adjustable brace will remain level and horizontal above the backside of the ceiling panel.

13 Claims, 7 Drawing Sheets

(56) References Cited

U.S. PATENT DOCUMENTS

| | | | | | |
|---|---|---|---|---|---|
| 4,405,111 | A * | 9/1983 | Lennon | E04C 3/02 | 211/105.4 |
| 4,463,923 | A * | 8/1984 | Reiker | F16M 13/027 | 248/57 |
| 4,513,994 | A * | 4/1985 | Dover | F21V 21/03 | 248/57 |
| 4,518,141 | A | 5/1985 | Parkin | | |
| 4,538,786 | A * | 9/1985 | Manning | F24F 13/32 | 248/656 |
| 4,659,051 | A * | 4/1987 | Propp | E04B 9/18 | 248/200.1 |
| 4,682,452 | A * | 7/1987 | Propp | E04B 9/006 | 220/3.9 |
| 5,024,412 | A * | 6/1991 | Hung | H02G 3/20 | 220/3.9 |
| 5,044,582 | A * | 9/1991 | Walters | H02G 3/126 | 248/200.1 |
| 5,150,868 | A * | 9/1992 | Kaden | H02G 3/20 | 248/200.1 |
| 5,303,894 | A * | 4/1994 | Deschamps | H02G 3/125 | 411/433 |
| 5,393,026 | A * | 2/1995 | Deschamps | H02G 3/125 | 248/57 |
| 5,720,461 | A * | 2/1998 | Kerr, Jr. | E04B 9/006 | 248/317 |
| 5,954,304 | A * | 9/1999 | Jorgensen | H02G 3/125 | 248/200.1 |
| 6,247,882 | B1 * | 6/2001 | Huang | B60P 7/15 | 410/151 |
| 6,491,270 | B1 * | 12/2002 | Pfaller | H02G 3/125 | 248/200.1 |
| 6,595,479 | B2 * | 7/2003 | Johnson | H02G 3/125 | 248/200.1 |
| 6,768,071 | B1 * | 7/2004 | Gretz | H02G 3/20 | 248/200.1 |
| 6,889,943 | B2 * | 5/2005 | Dinh | F04D 29/601 | 248/57 |
| 7,381,892 | B2 | 6/2008 | Kerr, Jr. | | |
| 7,429,025 | B1 * | 9/2008 | Gretz | H02G 3/20 | 248/200.1 |
| 7,595,448 | B2 | 9/2009 | Herth | | |
| 7,631,849 | B2 * | 12/2009 | Chen | F04D 25/088 | 220/3.9 |
| 7,735,794 | B1 * | 6/2010 | Gretz | E04B 9/006 | 248/200.1 |
| 7,837,172 | B2 * | 11/2010 | Johnson | H02G 3/20 | 248/343 |
| 7,857,275 | B2 * | 12/2010 | de la Borbolla | H02G 3/125 | 248/342 |
| 8,091,721 | B1 * | 1/2012 | Gretz | H02G 3/125 | 248/200.1 |
| 9,583,926 | B2 | 2/2017 | Ye | | |
| 9,735,557 | B1 * | 8/2017 | Gretz | H02G 3/125 | |
| 10,333,288 | B2 | 6/2019 | Korcz et al. | | |
| 10,554,030 | B1 * | 2/2020 | Baldwin | F16M 13/027 | |
| 11,038,329 | B1 * | 6/2021 | Baldwin | F16M 13/02 | |
| 11,777,293 | B1 * | 10/2023 | Baldwin | H02G 3/125 | 248/251 |
| 12,163,333 | B2 * | 12/2024 | Beristany | E04C 3/02 | |
| 2002/0179599 | A1 | 12/2002 | Dinh et al. | | |
| 2004/0182592 | A1 | 9/2004 | King et al. | | |
| 2005/0045793 | A1 * | 3/2005 | Johnson | F04D 29/601 | 248/343 |
| 2008/0067313 | A1 | 3/2008 | Herth | | |
| 2008/0179481 | A1 * | 7/2008 | Rubin de la Borbolla | H02G 3/125 | 248/200.1 |
| 2008/0296460 | A1 * | 12/2008 | Kerr, Jr. | F21V 21/02 | 248/343 |
| 2013/0320004 | A1 * | 12/2013 | Kerr, Jr. | H02G 3/125 | 220/3.9 |
| 2014/0238717 | A1 * | 8/2014 | Korcz | H02G 15/06 | 248/343 |
| 2014/0353442 | A1 * | 12/2014 | Ye | H02G 3/125 | 248/200.1 |
| 2015/0060616 | A1 * | 3/2015 | Jaramillo | F16M 11/22 | 248/200.1 |
| 2016/0126711 | A1 * | 5/2016 | Colangelo | H02G 3/12 | 248/200.1 |
| 2017/0331269 | A1 | 11/2017 | Hansen | | |
| 2018/0138679 | A1 * | 5/2018 | Lalancette | H02G 3/125 | |
| 2020/0325912 | A1 * | 10/2020 | Johnson | F04D 25/088 | |
| 2020/0373747 | A1 * | 11/2020 | Kay | F21S 8/036 | |
| 2025/0092668 | A1 * | 3/2025 | Korcz | E04B 1/388 | |

OTHER PUBLICATIONS

Ceiling Fan Mounting Bracket with Adjustable Bar Hanger, 1-1/2" Deep, 2 NMSCClamps, 2 1/2" Knockouts, Fits 16-24 Inch Joist Spaces, Ground Screw, Electrical Box for Light Fixtures (accessed Jun. 22, 2025) https://www.amazon.com/Mounting-Adjustable-Knockouts-Electrical-Fixtures/dp/BOBTMQ8HY1?th=1 Discloses an adjustable ceiling fan bracket with square end (no spikes).

Commercial Electric 4 in. Round 1-1_2 in. Deep 15.3 cu. in. Metallic CeilingFan_Light Fixture Box and Brace Kit for Old_New Work CMB150-OB—The HomeDepot (accessed Jun. 19, 2025) https://www.homedepot.com/p/Commercial-Electric-4-in-Round-1-1-2-in-Deep-15-3-cu-in-Metallic-Ceiling-Fan-Light-Fixture-Box-and-Brace-Kit-for-Old-New-Work-CMB150-OB/205383178 Discloses a legged light fixture securement with spikes.

"Therwen 2 Pcs Ceiling Fan Brace Electrical Box 14.25 to 22.5 Inch AdjustableElectrical Box and Support Bar Fan Mounting Bracket for Summer Light FixturesInstallations (Blue)," amazon.com. Nov. 27, 2024 (Date first available.) https://www.amazon.com/Therwen-Electrical-Adjustable-Mounting-Installations/dp/BODP4HQFQR?source=ps-sl-shoppingads-lpcontext&ref_=fplfs&smid=A1IQQGR8TI3M3L&th=1 Discloses the adjustable design of the ceiling fan electrical box on the barenhances the user friendly feature.

* cited by examiner

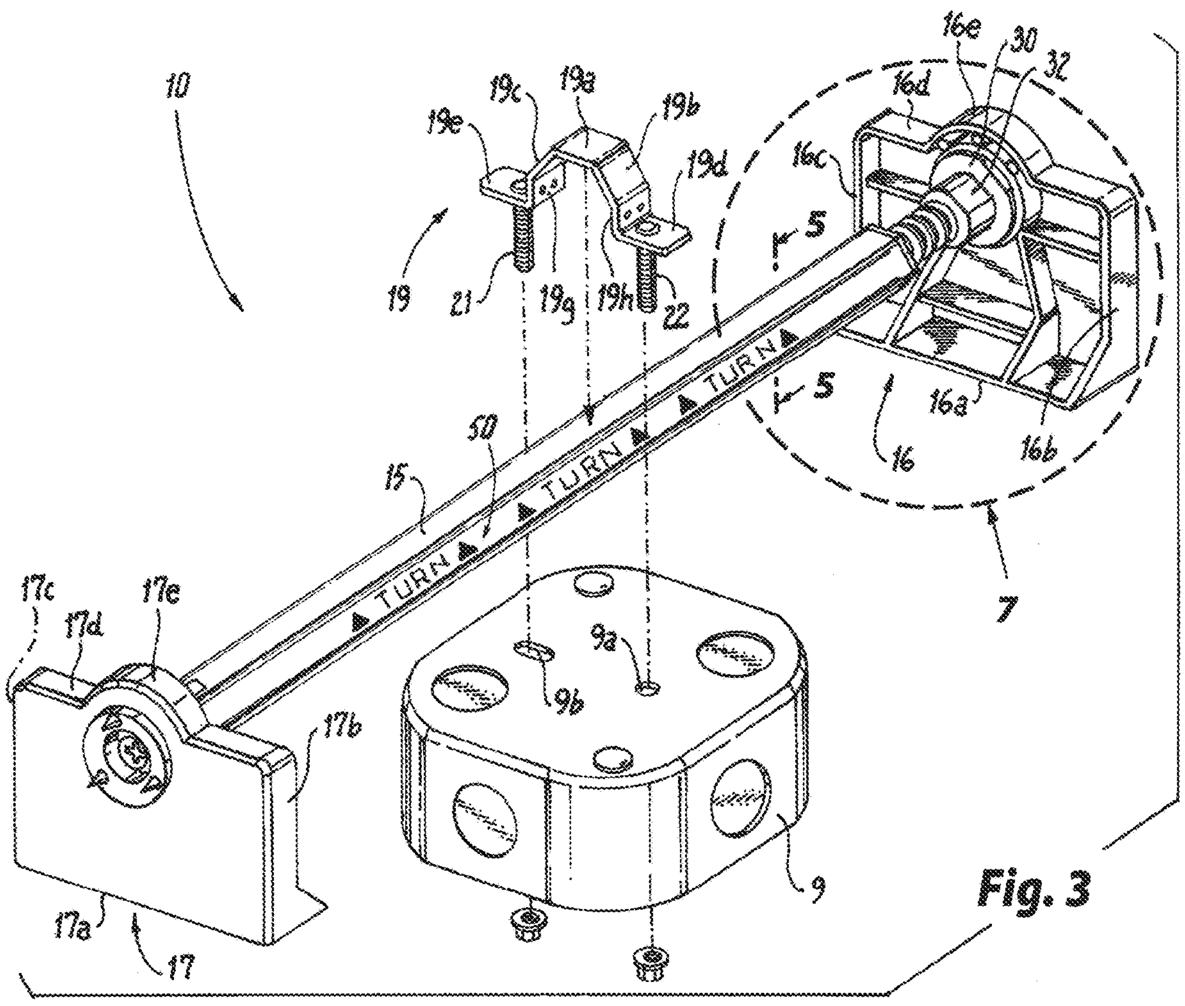
Fig. 3
Fig. 4
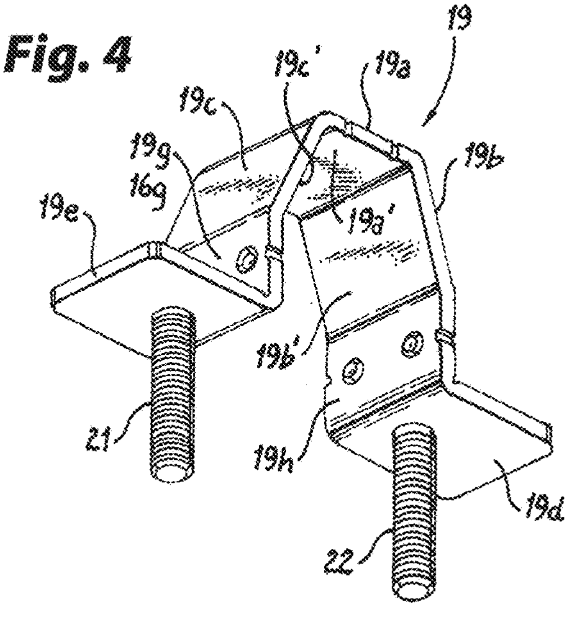
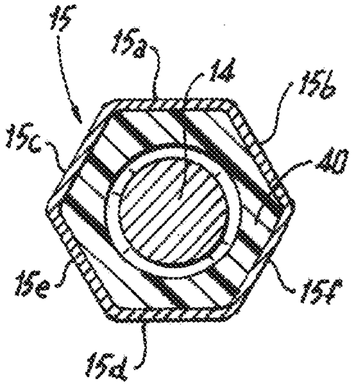
Fig. 5
10
19e 19c 19a 19b 19d 19 21 19g 19h 22
16e 30 32 16d 16c 5 5 16a 16 16b 7
15 50 TURN TURN TURN TURN
17c 17d 17e 17b 17a 17 9a 9b 9

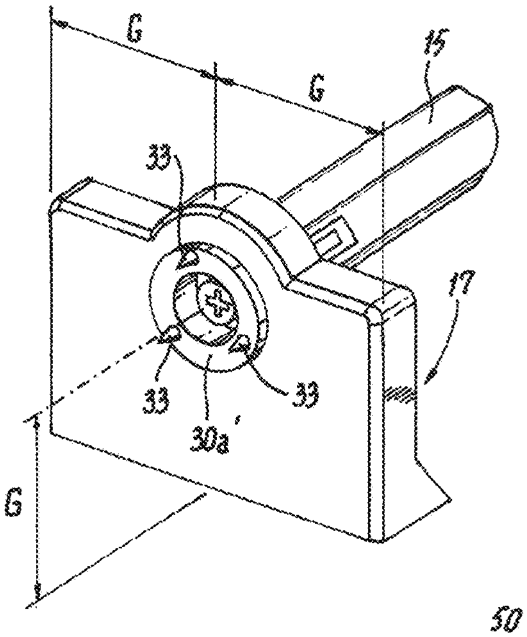
Fig. 6
Fig. 7
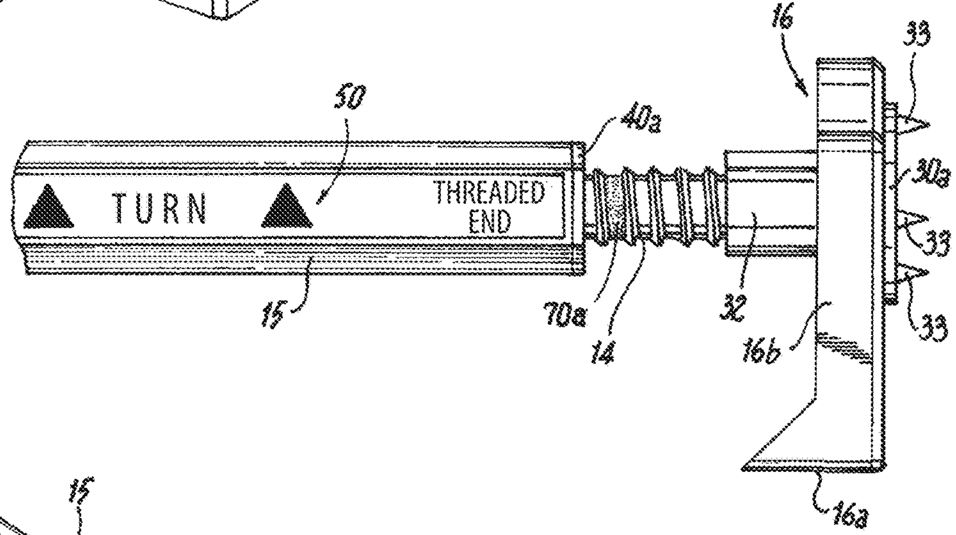
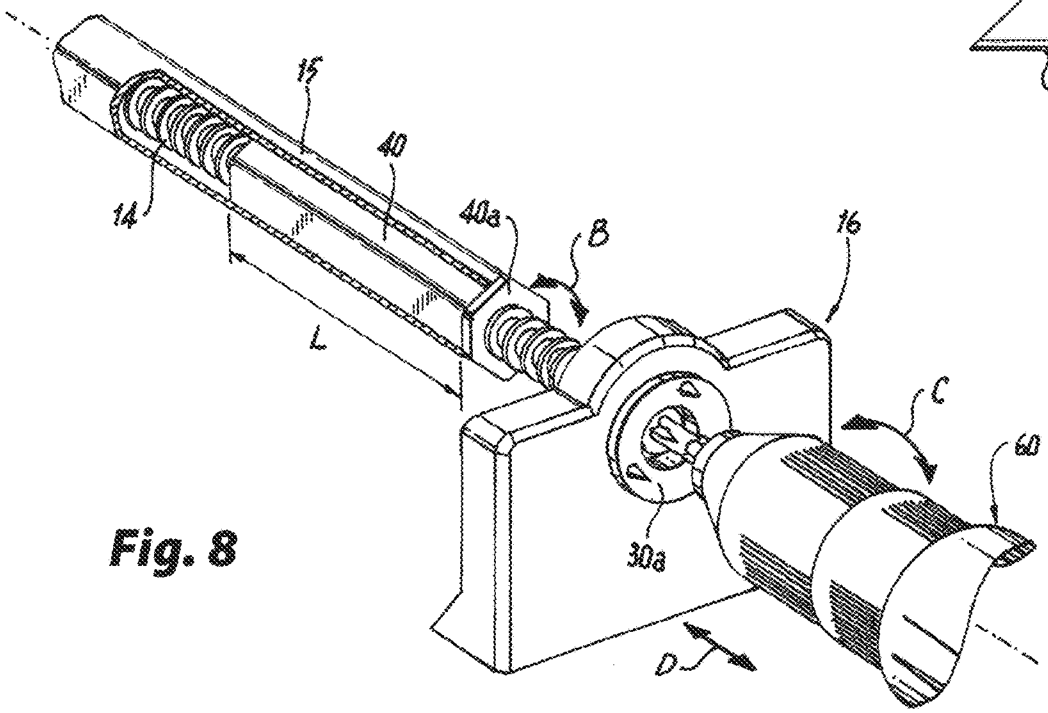
Fig. 8
G
G
15
33
17
33
33
30a'
G
16
33
50
40a
30a
TURN
THREADED END
33
15
70a
14
32
33
16b
16a
15
40
14
40a
B
16
L
C
60
30a
D

FAN/FIXTURE BOX AND ADJUSTABLE BRACE WITH MULTIPLE FOOTPRINT MOUNTING BLOCKS

FIELD OF THE INVENTION

The present invention is directed to a stable fan/fixture box and adjustable brace with multiple footprint mounting blocks for ceiling fan electrical boxes in old work environments, where the ceiling fan electrical box must be stabilized above the ceiling, and where only a small hole, such as, but not limited to, a four inch hole can be made in the preexisting drywall (where "drywall" is a descriptive name for such materials that may be sold under the trademark SHEETROCK®) or the preexisting ceiling panel, in order for an installer to insert the fan/fixture box and adjustable brace into the small hole, without any visual access to the area above the preexisting SHEETROCK® or ceiling panel. The bar brace has unique opposite end mounting blocks, with four sides, where the normally bottom edge has a predetermined fixed distance from a midpoint of a hole for a level threaded rod. This predetermined fixed distance is equal to the distance from the left and right-side edges, also in an equal distance from the hole for a level threaded rod, so that if one end mounting block topples over on its side edge, the threaded rod will remain level and horizontal. The stable fan/fixture box and adjustable brace also includes multiple visual indicia indicating the direction of turning a threaded rod within a polygonal sleeve tube, and separate visual indicia indicating the limits of moving the threaded rod within an insert of the polygonal sleeve tube.

BACKGROUND OF THE INVENTION

U.S. Pat. No. 5,720,461 of Kerr discloses a typical prior art installation of a fan brace for a ceiling fan electrical mounting box mounted in a backside layer of a ceiling panel, through a small hole in the ceiling panel. The ceiling fan brace of Kerr '461 typically has a threaded rod, which is held precariously in place by friction fit within an outer sleeve, by a small sleeve insert, typically having a one inch or two-inch length.

When installed through the hole in the ceiling panel, Kerr '461 discloses a pair of triangular mounting blocks which have a bottom base that is not stable enough to cause the triangular mounting block to remain upright, when the installer inadvertently contacts unseen objects such as wiring or insulation, above the backside of the ceiling panel, and topples one or both mounting blocks of Kerr'461.

Additionally, the small length of the friction fit insert itself of Kerr '461, is not sufficiently long in length to stabilize the threaded rod as level and stable above the backside of the ceiling panel. The prior art depicted threaded rod of Kerr '461 is therefore tentatively held in place by the opposite triangular end mounting blocks, which may topple over during installation, after the bar brace of Kerr '461 is first inserted through the small hole in the ceiling panel, above which the ceiling fan electrical mounting box is to be allegedly placed level and secured in place on the backside of the ceiling panel.

If one or both of the triangular end-mounting blocks of Kerr '461 topples over, the horizontal supporting threaded rod, held precariously in place by the friction fit insert within the outer sleeve for the bar brace, will lose its horizontal level orientation. This causes the ceiling fan mounting box of Kerr '461 to not be level with the backside of the ceiling panel, and will therefore be pitched slightly downward because one toppled end mounting block (or both) cause the misalignment of the bottom of the ceiling fan mounting box. If the ceiling fan and lighting box of Kerr '461 is misaligned, the ceiling fan mounting box will have to be properly re-installed and supported in a true level horizontal orientation. This causes additional time and labor.

OBJECTS OF THE INVENTION

It is therefore an object of the present invention to provide a fan/fixture box and adjustable brace which improves over the failures of the prior art.

It is also an object of the present invention to provide a stable fan/fixture box and adjustable brace which maintains a threaded rod within the brace as completely level and horizontal above the hole in the ceiling panel, while it is stable and fixed in place to opposite wall studs/joists in ceilings or walls.

It is another object of the present invention to provide footprints of mounting blocks for the brace where the distance between the midpoint of the threaded rod and the bottom of the mounting block is equal to the distance between the midpoint of the threaded rod and the respective sides of the mounting block, so that if the mounting block is inadvertently toppled over, the threaded rod will still remain level and horizontal between the opposite studs/joists, to keep the entire brace level and horizontal, so that the electrical/fixture box will be level when installed downward through the small hole within the SHEETROCK® or ceiling panel.

It is another object of the present invention to provide visual indicia marked on the outer sleeve of the brace indicating in what direction to rotate the brace above the SHEETROCK® or ceiling panel.

It is also another object of the present invention to provide visual indicia marked on the threaded rod of the brace to indicate the limits of movement of the threaded rod within the threaded insert of the outer sleeve of the brace, so that the threaded rod is not rotated outside of the threaded insert in which it rotates.

It is yet another object of the present invention to improve over the disadvantages of the prior art.

SUMMARY OF THE INVENTION

In keeping with the aforementioned objects of the present invention, this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In order to prevent and/or correct the aforementioned problems of the staggered non-horizontal attempted installation of a prior art fan/fixture box braces, a unique fan/fixture box and adjustable brace with multiple footprint mounting blocks and related stabilizing components is proposed.

The bar brace has unique opposite end mounting blocks, with four sides, where the normally bottom edge has a predetermined fixed distance from a hole for a level threaded rod. This predetermined fixed distance is equal to the distance from the left and right-side edges, also in an equal distance from the hole for a level threaded rod, so that if one end mounting block topples over on its side edge, the threaded rod will remain level and horizontal.

For example, this ceiling brace is for an old work box with a rectangular shape, to be installed by hand through a ceiling hole, each equally, versus a new work box where preexisting SHEETROCK® or ceiling panels have not been installed. In this old work box environment the preexisting SHEETROCK® or ceiling panel is already in place and a small hole must be cut to fit the size of the diameter of a fan/fixture box, and to allow the installer to insert the fan/fixture box and a stabilizing bar brace by hand to move the fan/fixture box and adjustable brace with multiple footprint mounting blocks, and the work box, through the ceiling hole and to orient it level in place above the preexisting SHEETROCK® or ceiling panel.

This hole is only a small hole, such as, but not limited to, a four inch hole, which can be made in the preexisting SHEETROCK® or ceiling panel, in order for an installer to insert the fan brace and electrical box into the small hole, without any visual access to the area above the preexisting SHEETROCK® or ceiling panel.

The fan/fixture box, when installed in the ceiling hole, will be exactly supported by the bar brace, which includes a structural threaded horizontal bar, so that the fan/fixture box can be installed below the horizontal rod and extend through the hole in a vertical downward direction.

The threaded rod of the fan/fixture box and adjustable brace with multiple footprint mounting blocks is expanded by turning it, so that the bar brace fits between adjacent studs above the preexisting SHEETROCK® or ceiling panel.

In order to assist the installer in rotating the bar brace, with the threaded rod within, preferably the outside of the bar brace is a polygonal sleeve tube, which bears visible indicia, such as, an arrow indicating the direction to turn the polygonal sleeve tube and the word "TURN".

The threaded rod is held in place within the polygonal sleeve tube by a metal or plastic insert that has a hollow central opening with interior threads engaging the threaded rod.

The insert is "friction-fit" within the polygonal sleeve tube. In order to stabilize the threaded rod preferably the "friction-fit" insert has a length "L" which is about four inches in length, to stabilize and allow threading of the threaded rod within the insert. While the insert can be provided in a length of about three to six inches in length, preferably the insert is four inches in length. The length of the insert stabilizes the threaded rod in place within the polygonal sleeve tube when fully extended, unlike a smaller length insert of one to two inches in length of the prior art.

The threaded rod preferably has a distal paint mark, and a proximal paint mark (unshown) which warns the installer that the threaded rod is reaching its limit of travel within the threaded insert and therefore risks pull out from the insert. The distal paint mark and the proximal paint mark (not shown) denotes the safe limit of the threaded rod extension.

The bar brace with polygonal tube sleeve, "friction-fit" insert and threaded rod are is supported by the opposite mounting blocks which have perpendicular walls, so that if one or both end mounting blocks falls over on one side, the ceiling bar will still be level and horizontal, when moved by the installer's hand reaching up into the dark small hole above the preexisting SHEETROCK® or ceiling panel, where the hole is preferably, but not limited to 4 inches in diameter, into which the fan/fixture box is to be installed in a horizontal level orientation, while extending downward to hold the heavy components of a ceiling fan and associated lighting.

This fan/fixture box and adjustable brace with rectangular end mounting blocks, each with equal-sized side and bottom edges, is an improvement over use of triangular mounting blocks, which can easily topple over during installation.

For example, with the present invention, the mounting bar brace is still perfectly level when installed in the dark area above the preexisting SHEETROCK® or ceiling panel. The end mounting blocks are configured to be generally rectangular or square in shape, so that if the end mounting block topples and falls over, its left- or right-side will rotate so that the left- or right-side will replace the bottom horizontal surface of the mounting block in a horizontal level orientation.

This positioning of the end mounting block is important so that when the installer pushes the bar brace and mounting box for the fan/fixture box up into the ceiling hole into the space in the dark above the preexisting SHEETROCK® or ceiling panel improves over the situation where the installer may hit an object or there may be insulation in the way, or existing wiring in the way, but the obstructions may be so slight that the installer doesn't really feel the obstruction. Therefore, if triangular end mounting blocks are used, it may be hard to tell if the triangular end mounting block is toppled over.

In contrast to the use of triangular prior art end mounting blocks, the use of horizontal square or rectangular opposite end mounting blocks are therefore configured so that if they topple over on the side, the mounting bar brace will still be horizontal and level above the preexisting SHEETROCK® or ceiling panel, which is an important feature of the present invention.

At the opposite ends of the end mounting blocks there are provided left and right end plates with pointed stakes/spikes, which engage into the respective smooth sides of the studs on either side of the hole, which is preferably, but not limited to, 4 inches in diameter, in the preexisting SHEETROCK® or ceiling panel, to stabilize the bar brace and electrical components in the mounting box in a level orientation between the two opposite wooden studs above the preexisting SHEETROCK® or ceiling panel.

The mounting rod is threaded so that it can be advanced toward the respective distal mounting block, as the installer turns the threaded rod so that the pointed stakes/spikes on either side of the opposite mounting blocks point into the wooden studs on the distal side mounting blocks, after the proximal side of the brace bar is pushed into the proximal stud.

The threaded rod is protected within the polygonal sleeve tube (such as hexagonal six-sided in shape) and the "friction-fit" insert, so that the threaded rod is held in place within the sleeve tube and in the "friction-fit" insert so that it stays securely in place while it is threadably moved forward towards the distal stud on the distal side of the polygonal sleeve tube and "friction-fit" sleeve, where the distal end mounting block contacts the stud with its stakes/spikes.

Before the threaded rod is inserted into the ceiling within the polygonal tube sleeve, optionally it's distal ends can be moved forward in place by using a drill with a reverse thread, to allow for movement of the threaded rod to advance within the respective distal end mounting block in the proper level orientation, even if one of the mounting blocks has toppled 90 degrees on its side, because the receptacle in the distal end mounting block is centrally positioned, so that the threaded rod can advance within the receptacle in the distal end mounting block, so matter whether the distal end mounting block has toppled 90 degrees on its side or not. Should the distal end mounting block somehow roll over, the dimension lines "G" for the bottom and sides of each mounting block are equal, resulting in the level installation of the mounting block despite the rolling and toppling over of the mounting block.

Therefore, as noted above, the threaded rod is equipped with a receiver for a drill bit, allowing the installer to rapidly advance or decrease the length of the distal end of the threaded rod using a drill, prior to placement within the ceiling. After the reverse threading of the threaded rod, which is installed in the bar brace, within the polygonal sleeve tube, and within "friction-fit" insert, so that the threaded rod can move forward towards the distal end mounting block, which can be installed in place at the distal end of the threaded mounting rod.

One side of the hexagonal tube sleeve is attached first to the proximal end mounting block, which has a circular plate on the exterior outer side of the first mounting block, and which has pointed stakes/spikes on that outer side, to immediately push into and secure the bar brace to one stud on the proximal side.

Once that first proximal end mounting block is secured in plaice to its closest stud, the polygonal tube sleeve with the "friction-fit" insert and threaded rod is grasped by the installer and rotated so that the threaded rod is advanced toward the opposite distal, second stud, nearest to the distally advancing threaded rod, so that the pointed stakes/spikes can hold the threaded rod level and horizontal above the preexisting SHEETROCK® or ceiling panel.

Once the distal end second mounting block is secured in place to the opposite second stud so that the bar brace is snug between the two studs, the fan/fixture box is attached to the hexagonal sleeve with a saddle brace, so that the mounting box for the ceiling fan component is also provided in a level and stable orientation facing downward, no matter what the weight of the ceiling fan components are, such as about 35 to 50 pounds.

For example, the mounting box for the ceiling fan and lighting components is attached to the polygonal sleeve tube by the saddle brace, which has a top and side surfaces which conform to the top and side polygonal surfaces of the polygonal tube sleeve, as well as with two opposite horizontal flanges of the saddle brace with holes for insertion of screw fasteners through each flange and then into the mounting box, so that it is fastened in place securely to the saddle brace and therefore also to the polygonal tube sleeve having the level threaded rod threadably in place therein.

The polygonal tube sleeve is twisted over itself by the installer until the threaded rod engages the distal side stud by its related pointed stakes/spikes in the end plates of the distal end mounting block, so that the entire bar brace for the ceiling fan/fixture box is horizontally level above the preexisting SHEETROCK® or ceiling panel with the mounting box for the ceiling fan and lighting components extending perfectly downward in a vertical orientation below the horizontally level supporting bar brace above the preexisting SHEETROCK® or ceiling panel.

BRIEF DESCRIPTION OF THE DRAWINGS

FIG. 3 is an exploded perspective view of the ceiling fan/fixture box and adjustable brace for a ceiling fan electrical work box of the present invention, showing the bar brace with opposite mounting blocks at either end and a saddle brace with two lock nuts, which are shown about to be inserted over the bar brace and into the ceiling fan/fixture box having receptacles for insertion of the two lock nuts therein. The opposite end mounting blocks are uniquely configured for stability with perpendicular sides, top and bottom portions thereof, so that if the end mounting block is inadvertently toppled at 90 degrees, perpendicular to the bottom base of the mounting block, the right-side or left side of each end mounting block (or mirror image thereof) will maintain the proper horizontal orientation of the ceiling bar with its threaded rod and it's ceiling fan/fixture box supported thereunder, so that the threaded rod and saddle brace holding the ceiling fan/fixture box will remain level and horizontal. This level and horizontal orientation of the bar brace will therefore prevent any deviation of the adjustable bar brace and its ceiling fan/fixture box off of its proper level horizontal orientation.

FIG. 4 is a close up detail perspective view of the underside of the saddle brace which has left, top and right interior surfaces which engage the left, top and right exterior surfaces of the bar brace of FIG. 3, wherein the lock nuts are shown descending from opposite horizontal wings of the saddle brace before insertion into the top of the ceiling fan electrical box being supported by the bar brace of the present invention.

FIG. 5 is a close up cross sectional view, taken along view lines 5-5 of FIG. 3, of the hexagonal bar brace of FIG. 3, showing also in cross section the threaded tubular rod located inside the bar brace, where the threaded rod is used to maintain the ceiling fan/fixture box and adjustable brace in a horizontal orientation above the preexisting SHEETROCK® or ceiling panel or wall 2.

FIGS. 8 and 12 also show the threaded rod located within the "friction fit" insert, which is also located inside of the polygonal tubular sleeve, which is attached to the ceiling mounting box for the lighting and fan components suspended therefrom, by the saddle brace attached by threaded fasteners through holes in the top of the ceiling box. While one hole is round, the other hole is preferably oblong, so that the threaded fasteners can be inserted, without having to have exact matching of the threaded fasteners being inserted into the two holes of the ceiling mounting box.

FIG. 6 is a close-up perspective detail view of the left-mounting block shown in position on the backside of the preexisting SHEETROCK® or ceiling panel where the hexagonal sleeve of the bar brace engages the left-mounting block by the threaded inner rod of the bar brace threadably engaging opposite threads in the left-mounting block. The arrow lines "G" shown depict the equal distance to the midpoint of the threaded rod, between the left, bottom and right-sides of the left-mounting block, demonstrating that the hexagonal sleeve will always be entering the left or right-mounting blocks no matter whether the mounting block is standing upright on its bottom base, or standing on either of its left and right-side edges of the mounting block, so that the ceiling fan/fixture box and adjustable brace is always oriented horizontally, no matter whether one of the mounting blocks is standing on its bottom edge or has toppled over on its side and is standing on its perpendicular side edge.

FIG. 7 is a front elevation view of the right-mounting block, taken along the dashed circle line "7" shown in FIG. 3, showing the threaded rod inserted into the receptacle of the right-mounting block, as the threaded rod extends beyond the hexagonal sleeve of the bar mounting block. Instructional indicia are shown with arrows and the word "TURN" showing the direction of turning the threaded end of the threaded rod into the right-mounting block. FIG. 7 also shows the mounting block in a side view where the round plate in which the threaded rod is engaged includes a tubular reciprocal threaded sleeve mating with the threads of the threaded rod, on one inner-facing side of the mounting block, and a larger diameter round distal plate, on the other outer, stud-facing side of the mounting block, which includes protruding stakes/spikes which will forcefully engage a respective stud above the preexisting SHEETROCK® or ceiling panel to fix the threaded rod securely and horizontally in place, where the ceiling fan/fixture box descends directly vertically down through the round hole, which is preferably, but not limited to, 4 inches in diameter, in the ceiling so that the ceiling fan/fixture box will be properly oriented in a vertical position below the threaded rod. While FIG. 7 shows the right-side mounting block in a side view, it is assumed that the left-side mounting block is a mirror image of the right-side mounting block.

FIG. 8 is a perspective view of the ceiling fan/fixture box and adjustable brace, before it is installed through the ceiling hole as shown from drawing FIG. 9. The small ceiling hole is preferably, but not limited to, 4 inches in diameter. In order to grip opposite studs above the ceiling, the opposite ends of the two end mounting blocks of the ceiling fan/fixture box and adjustable brace, each having respective protruding stakes/spikes, the distance between which must be measured so that the ceiling fan/fixture box and adjustable brace underneath the saddle brace can engage the opposite studs between which the ceiling fan/fixture box and adjustable brace is to be secured in place. Therefore, the proximal opposite end of the ceiling fan/fixture box and adjustable brace has a round plate with protruding stakes/spikes engaging the proximal stud. Additionally, the distal end of the ceiling fan/fixture box and adjustable brace having the threaded rod within the opposite distal end mounting block thereof, also has a round plate which has reverse threads so that the protruding stakes/spikes on the round plate of the opposite distal end mounting blocks of the ceiling fan/fixture box will also securely protrude into the respective opposite distal stud in the ceiling, wherein the ceiling fan/fixture box and adjustable brace is firmly held between two opposite studs extending above the ceiling. Consequently, FIG. 8 shows a user's power drill for rotating in reverse the receptacle of the distal end mounting block of the ceiling fan/fixture box and adjustable brace, to facilitate the threading engagement of the protruding stakes/spikes located on the round plate of the distal end mounting block accommodating the threaded rod of the bar brace therein. The arrows show the rotational directions and the forward advancement of the threaded rod towards the right distal end mounting block.

At the opposite proximal end of the polygonal tube sleeve, a similar round plate includes stakes/spikes to pierce and attach the proximal stud. FIG. 9 also shows the pair of studs spaced apart from each other at a distance exceeding the length of the bar brace, so that when the distal end of the threaded rod advances to the distal end mounting block, the bar brace is installed securely between the pair of studs shown.

FIG. 12 is a cross sectional detailed view of the installed polygonal sleeve tube having the end of the "friction-fit" insert shown in FIG. 9 with the hexagonal sleeve of the bar brace holding the centrally located threaded rod therein, and wherein the interior top left and right-sides of the saddle brace include interior surfaces 19*a*', right 19*b*' and left 19*c*' (shown in FIG. 4) which grasp the hexagonal top half of the hexagonal sleeve of the bar brace, and wherein the threaded fasteners engage through the top of the ceiling fan electrical box to stabilize it in place when the ceiling box of FIG. 3 is mounted in place within the ceiling, for supporting an electrical fan therefrom.

DETAILED DESCRIPTION OF THE DRAWINGS

Figure 1:
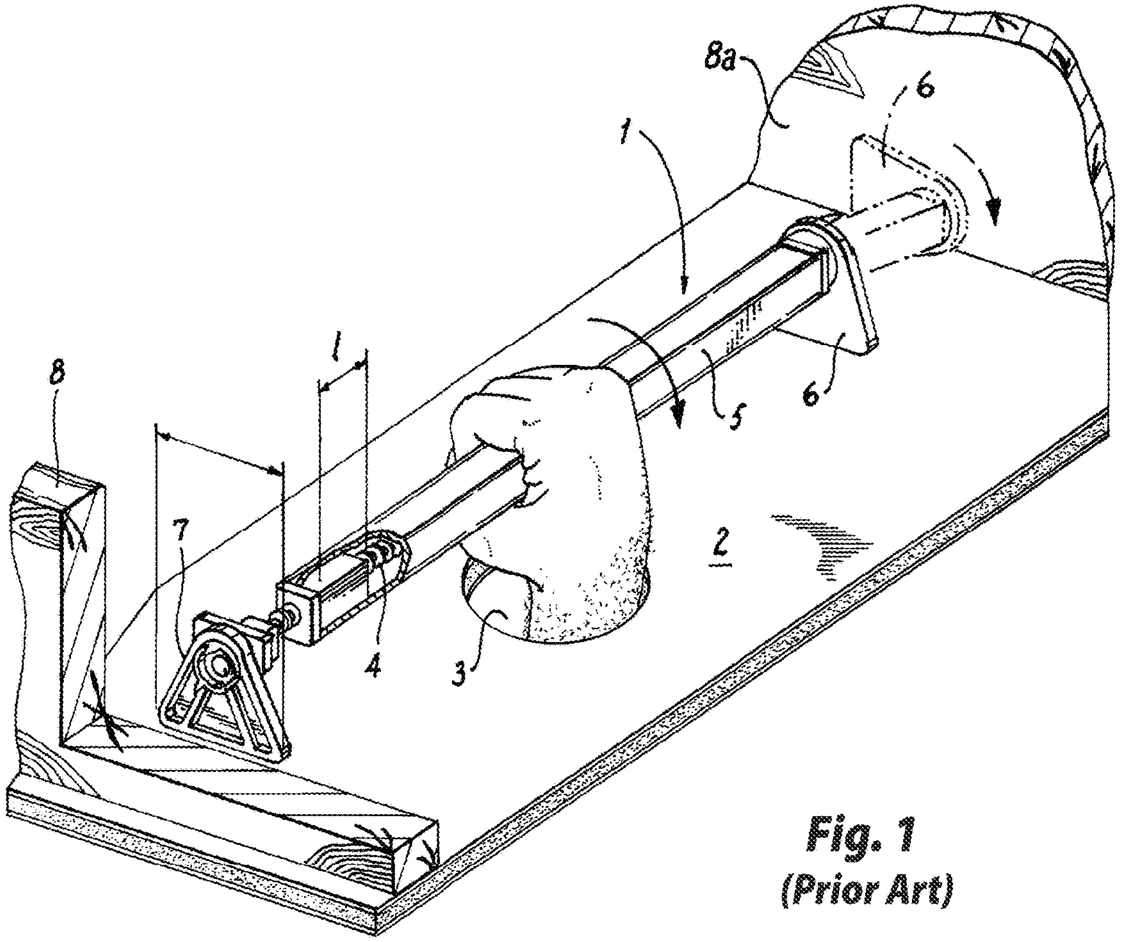
FIG. 1 is a perspective view of a prior art installation of a fan brace for a ceiling fan electrical box in a backside layer of a ceiling, where the ceiling fan/fixture box has triangular end mounting blocks which may topple over during installation and cause the ceiling fan/fixture box to be not flushed with the bottom of the preexisting SHEETROCK® or ceiling panel because the toppled end mounting blocks have cause the misalignment of the bottom of the ceiling fan/fixture box, as shown in FIG. 2.

As used throughout this specification, the word "fan/fixture box" may refer to a ceiling fan box, with or without an electrical lighting fixture, or may refer to an electrical fixture box, with or without a ceiling fan.

The term "may" is used in a permissive sense (i.e., meaning having the potential to, or being optional), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value or recitation modified by a term such as "about" is not to be limited to the precise theoretical characteristic or value specified, and may include values that differ from the specified value in accordance with design variations that may be described in the specification, as well as applicable case law. Also, in at least some instances, a numerical difference provided by the approximating language may correspond to the precision of an instrument that may be used for measuring the value or characteristic (e.g., a recitation of being "substantially straight"). A numerical difference provided by the approximating language may also correspond to a manufacturing tolerance associated with production of the aspect/feature being quantified/described (see e.g., *Ex Parte Ollmar*, Appeal No. 2014-006128 (PTAB 2016)). Furthermore, a numerical difference provided by the approximating language may also correspond to an overall tolerance for the aspect/feature that may be derived from variations resulting from a stack up (i.e., the sum) of a multiplicity of such individual tolerances.

Similarly, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. Any structures or methods described herein with respect to two elements being fixedly secured together means that any suitable joining technique known in the art may be used, including, but not limited to, using mechanical fasteners (e.g., rivets, screws, bolts & nuts, threaded inserts, etc.), adhesive, welding techniques (arc welding, friction welding, etc.), etc.

The present invention has broad applications to many technical fields for a variety of articles. For illustrative purposes only, a preferred mode for carrying out the invention is described herein.

Figure 2:
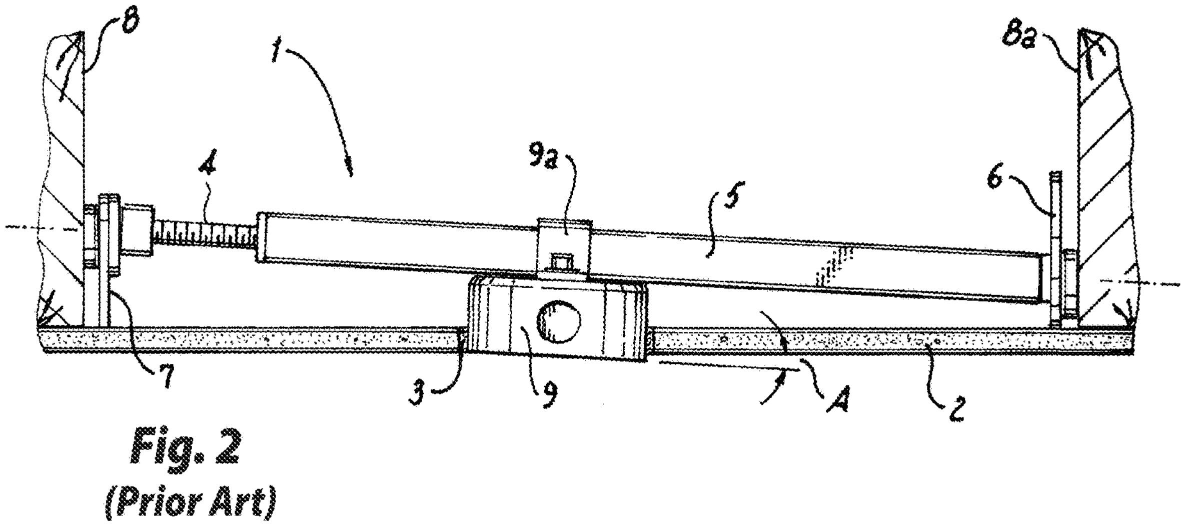
FIG. 2 is a front elevation view of the prior art installation of the fan brace for the ceiling fan/fixture electrical box in the backside layer of the ceiling, showing the curved arrows, for angle "A", indicating a misalignment of the mounting box for a ceiling fan because of the toppling of the right-side triangular mounting block. This misalignment creates a wobble of the threaded rod, allowing the distal end mounting block to potentially rotate during installation. Due to the plate's triangular shape and the sides not having equal lengths, the result is an angled installation of the bar brace as the triangular plate has migrated or rolled out of sight of the installer. This misalignment is seen in FIG. 2.

FIG. 1 shows a prior art installation of a ceiling fan brace 1 with a threaded rod 4 within a square sleeve 5 for a ceiling fan electrical mounting box 9 in a backside layer of a ceiling 2, where the ceiling fan brace 1 has triangular end mounting blocks 6 and 7 which may topple over during installation and cause the ceiling fan/fixture box 9 to be not flushed with the bottom of the preexisting SHEETROCK® or ceiling panel 2 because the toppled end mounting blocks 6 and 7 have caused the misalignment of the bottom of fan/fixture box 9, as shown by the curved angle arrows for angle "A" in FIG. 2.

FIG. 2 shows the prior art installation for the ceiling fan/fixture box 9 with one of the toppled triangular end mounting blocks 6 of the adjustable brace 1 for the ceiling fan electrical box 9 in the backside layer of the ceiling 2, showing the curved arrows, for angle "A" in FIG. 2, indicating a misalignment of the mounting box 9 for a ceiling fan because of the toppling of the right-side triangular mounting block 6.

In a prior art installation of an adjustable brace 1 for a ceiling fan/fixture mounting box 9 in a backside layer of a preexisting SHEETROCK® or ceiling panel 2, through a small hole 3 in the preexisting SHEETROCK® or ceiling panel 2, as shown in prior art FIGS. 1 and 2, the adjustable brace 1 typically has a threaded rod 4, which is held in place within an outer sleeve 5 by a small insert 4*a*, typically having a one inch or two inch length "l" (shown as alphanumerical reference letter "l"). When installed through the hole 3 in the preexisting SHEETROCK® or ceiling panel 2, each triangular mounting blocks 6 and 7 have a bottom base that is not stable enough to cause the triangular mounting block 6 or 7 to remain upright, when inadvertently contacting unseen objects such as wiring or insulation, above the preexisting SHEETROCK® or ceiling panel 2.

Additionally, the small length "l" of the insert 4*a* itself is not sufficiently long in length to stabilize the threaded rod 4 as level and stable above the preexisting SHEETROCK® or ceiling panel 2. The prior art depicted threaded rod 4 is tentatively held in place by the opposite triangular end mounting blocks 6 and 7, which may topple over during installation, after the bar brace 1 is inserted through a small hole 3 in the preexisting SHEETROCK® or ceiling panel 2, into which the ceiling fan electrical mounting box 9 is to be allegedly placed level and secured in place. The toppling over of triangular mounting block 6 and/or 7 can occur if the installer's hand inserted bar brace 1, should it contact insulation, wiring or other objects not viewable through the small hole 3. If one or both of the triangular end mounting blocks 6 or 7 topples over, the horizontal supporting brace 4, will lose its horizontal level orientation. This causes the fan/fixture box 9 to be not level with the bottom of the preexisting SHEETROCK® or ceiling panel 2 pitched slightly downward because the toppled end mounting block/mounting blocks 6 or 7 (or both) cause the misalignment of the bottom of the ceiling fan/fixture box 9. If the ceiling fan and lighting box 9 is misaligned, the ceiling fan and lighting box 9 will have to be un-installed and then supported in a true level horizontal orientation. This causes additional time and labor.

FIG. 3 shows an exploded perspective view of the ceiling fan adjustable bar brace 10 of the present invention, for supporting a ceiling fan electrical work box 9 in a level orientation through the ceiling hole 3, preferably, but not limited to, 4 inches in diameter, of the preexisting SHEETROCK® or ceiling panel 2, showing the adjustable bar brace 10 having therein a threaded rod 14 threadably engageable toward distal mounting block 16 on the right-side of the drawing FIG. 3 and away from opposite proximal mounting block 17 on the left-side of the drawing FIG. 3, each mounting block 16 and 17 located at opposite ends of the adjustable bar brace 10.

As shown in FIGS. 5, 5A, 5B, 8 and 12, the threaded rod 14 is threadably held in place within the polygonal sleeve tube 15 by a "friction fit" plastic or metal insert 40 that snuggly contacts the interior of the polygonal tube sleeve 15. As shown in FIGS. 5, 5A, 5B and 12, the insert 40 has centrally located internal reciprocal threads 40*b* that engage the external threads of threaded rod 14.

As also shown in FIGS. 5, 5A, 5B and 12, in order to stabilize the threaded rod 14, preferably the insert 40 is about four inches in length "L" to stabilize and allow threading of the threaded rod 14 within the insert 40. While the insert 40 can be provided in a range of length "L" of about three to six inches in length, preferably the insert has a length "L", which is four inches in length.

Before the threaded rod 14, which is threadably contained within the insert 40, the insert 40 is "friction fit" in place within the inside of polygonal tube sleeve 15, which, along with threaded rod 14, are together inserted into the preexisting SHEETROCK® or ceiling panel 2.

While drawing FIGS. 3 and 6-11 show the distal, right-side mounting block as reference numeral 16 and the proximal, left-side mounting block as reference numeral 17 in the drawings, it is noted that mirror image configurations could be construed, so that the threaded rod 14 can extend toward a mirror image distal end 17, away from a mirror image proximal end 16.

However, for the point of clarity, in drawing FIGS. 3 and 6-11, reference numeral 16 refers to the distal end reception of the threaded rod 14 into receptacles in mounting block 16 and the proximal end of the threaded rod 14 is threaded away from the proximal mounting block 17 on the left-side of the drawings herein.

FIG. 3 shows the threaded rod 14 is movable within the fan brace assembly through the distal, right-side mounting block 16, toward one of the studs 8*a*. The right-side distal mounting block 16 includes preferably round plate 30 having a round sleeve 32 with reciprocal threaded interior engaging the exterior threads of threaded rod 14. The opposite side of the round plate 30 attached to distal mounting block 16 has a rear face distal disk collar 30*b*, with pointed stakes/spikes 33 contacting the face of stud 8*a*, to securely hold the right-side distal mounting block 16 in place after the threaded rod 14 has been advanced a sufficient distance forward distally, so that rear face 30*a* of round plate 30 can contact the stud 8*a* via piercing contact of the stakes/spikes 33. The interior threads of the mounting block 16 are also engageable with the exterior threads of the threaded rod 14, beyond the distal end plate 40*a* of the "friction-fit" insert 40 through which the exterior threads of threaded rod 14 is advanced via the installer's turning of the exterior polygonal sleeve tube 15.

FIG. 3 also shows a saddle brace 19 with two lock nuts 21 and 22, which are shown in an exploded view about to be inserted over the polygonal sleeve tube 15 of the adjustable bar brace 10 and into the ceiling fan electrical box 9 having receptacles 9*a* and 9*b* for insertion of the two lock nuts 21 and 22 therein.

As also shown in FIG. 3, in order to assist the installer in rotating the polygonal sleeve tube 15 of the adjustable bar brace 10 correctly, with the threaded rod 14 therewithin, preferably the outside of the polygonal sleeve tube 15 bears visible indicia 50, such as, one or more directional arrows indicating the direction in which to turn the polygonal sleeve tube 15 and the word "TURN". The visible indicia 50 can be printed directly onto the polygonal tube sleeve 15, or it can be printed onto a decal which is directly attached to the polygonal tube sleeve 15.

Figure 9:
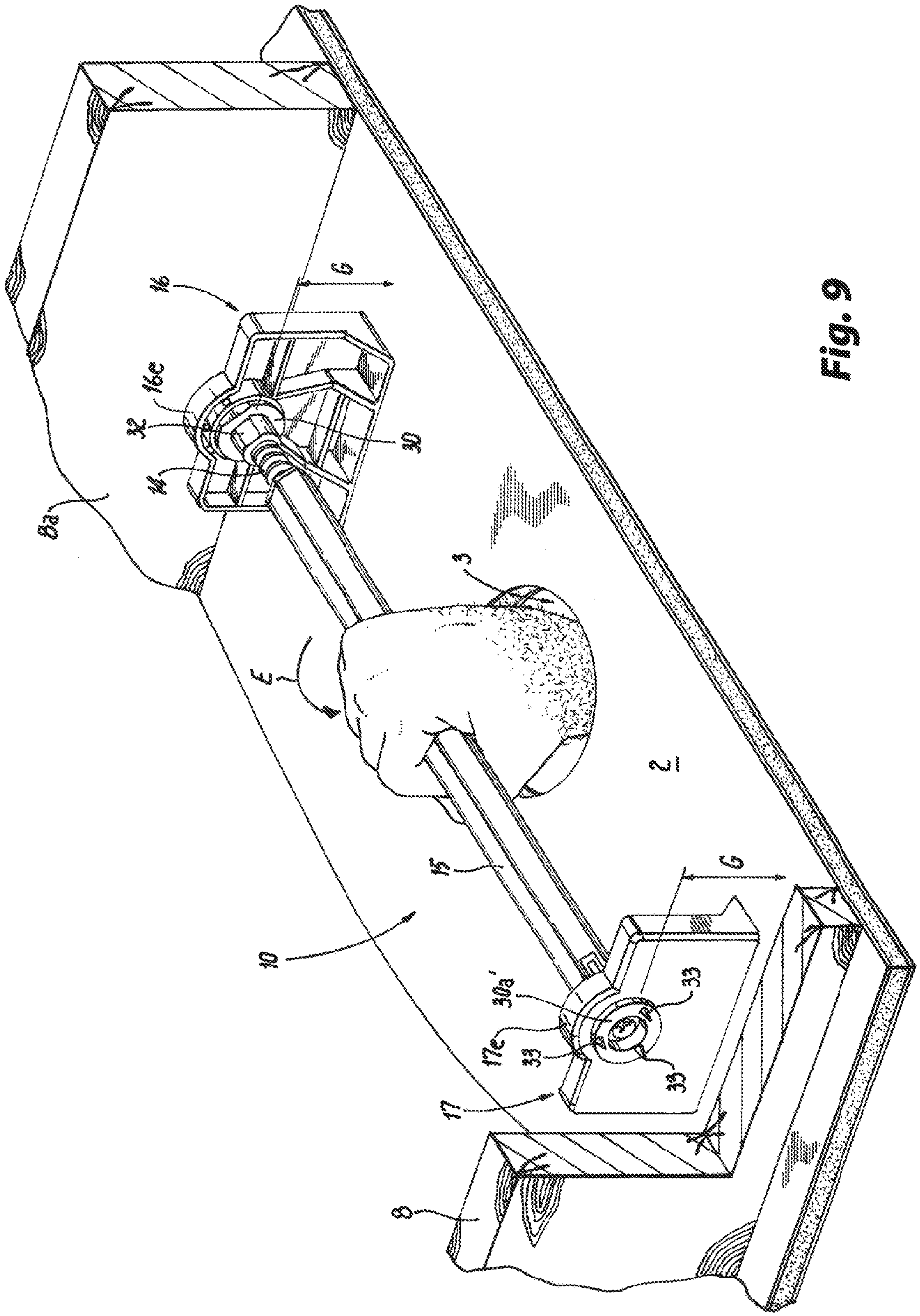
FIG. 9 is a perspective view showing a user's hand extending through a circular hole, such as for example, having a diameter preferably, but not limited to, 4 inches in diameter in the preexisting SHEETROCK® or ceiling panel and rotating the polygonal sleeve tube of the bar brace so that the protruding stakes/spikes of the round plate located at the distal end of the threaded rod within the hexagonal sleeve tube of the bar brace engage the stud on the right distal side of the ceiling bar's distal end mounting blocks.

Once the non-movable opposite side proximal mounting block 17 is secured in plaice to its closest stud 8, shown in FIG. 9, the polygonal tube sleeve 15 is then grasped by the installer and rotated so that the threaded rod 14 is advanced toward the opposite distal end mounting block 16 (shown on the right-side of FIG. 3) and then to the distal right-side opposite, second stud 8*a*, nearest to the advancing threaded rod 14, so that the pointed stakes/spikes 33 of the rear face 30*a* of the face plate 30, attached to opposite second distal mounting block 16, can hold the threaded rod 14 level in horizontal orientation above the preexisting SHEETROCK® or ceiling panel 2.

Once the second mounting block 16 is secured in place to the opposite second stud 8*a* via the pointed stakes/spikes 33 on the distal side of the round plate 30, the mounting box 9 for the ceiling fan's electrical and mechanical components, is at that time attached to the hexagonal sleeve tube 15, with the saddle brace 19 shown in FIGS. 3, 4, 11 and 12, to support the mounting box 9 for the ceiling fan component also provided in a level orientation facing downward from the polygonal tube sleeve 15, in a stable orientation, no matter what the weight of the ceiling fan components are, such as being about 35 to 50 pounds.

For example, the mounting box 9 or the ceiling fan and lighting components is attached to the polygonal sleeve tube 15 by the saddle brace 19 which has a top 19*a* and side surfaces 19*b* and 19*c*, which conformed top and side polygonal surfaces 15*a*, 15*b* and 15*c* of the polygonal tube sleeve 15, as well as two opposite horizontal flanges 19*d* and 19*e* with holes for insertion of lock nuts 21 and 22 through each flange 19*d* and 19*e* and then into the receptacles 9*a* and 9*b* of ceiling fan component mounting box 9. so that it is fastened level in place securely to the saddle brace 19 and therefore also to the polygonal tube sleeve 15, having the advancing threaded rod 14 threadably in place therein.

Optionally, as shown in FIG. 8, before the threaded rod 14 is inserted into the ceiling hole 3, preferably, but not limited to, 4 inches in diameter, with the hexagonal tube sleeve 15, insert 40 and opposite end mounting blocks 16 and 17, the threaded rod 14, threadably located within the insert 40 of the polygonal tube sleeve 15, at its distal end, can be moved forward in place by using a drill 60 with a reverse thread shown in FIG. 8 as a labor saver. The drill can engage a "Phillips-Head" of a fastener within the distal right-side round plate 30 that is on, and extends through, both sides of the right-side distal mounting block 16. This reverse thread of a fastener with a "Phillips-Head" configuration, allows for quick labor saving movement of the threaded rod 14 to advance within the closest respective end mounting block 16 in the proper level orientation before the assembled set of the polygonal tube sleeve 50, the insert 40 and the threaded rod 14, together with end mounting blocks 16 and 17, are inserted by the installer's hand through the hole 3, preferably but not limited to, 4 inches in diameter, in the preexisting SHEETROCK® or ceiling panel 2 for level installation. The curved arrows shown as angle "B" in FIG. 8 show the rotational directions of the threaded rod 14 and the curved arrows shown as angle "C" and the linear arrows of the power drill unit, and the linear arrows showing dimension line "D", indicate the linear movement of the threaded rod 14 in the forward advancement of the power threader 14 towards the right-mounting block 16 before the adjustable bar brace 10 and its components are manually inserted by hand through the hole 3, preferably, but not limited to, 4 inches in diameter, in preexisting SHEETROCK® or ceiling panel 2.

A mirror image thereof is also applicable to the rotation of the polygonal sheeve 15 and the threaded rod 14 towards the opposite end mounting block 17 (not shown in FIG. 8).

Figure 10:
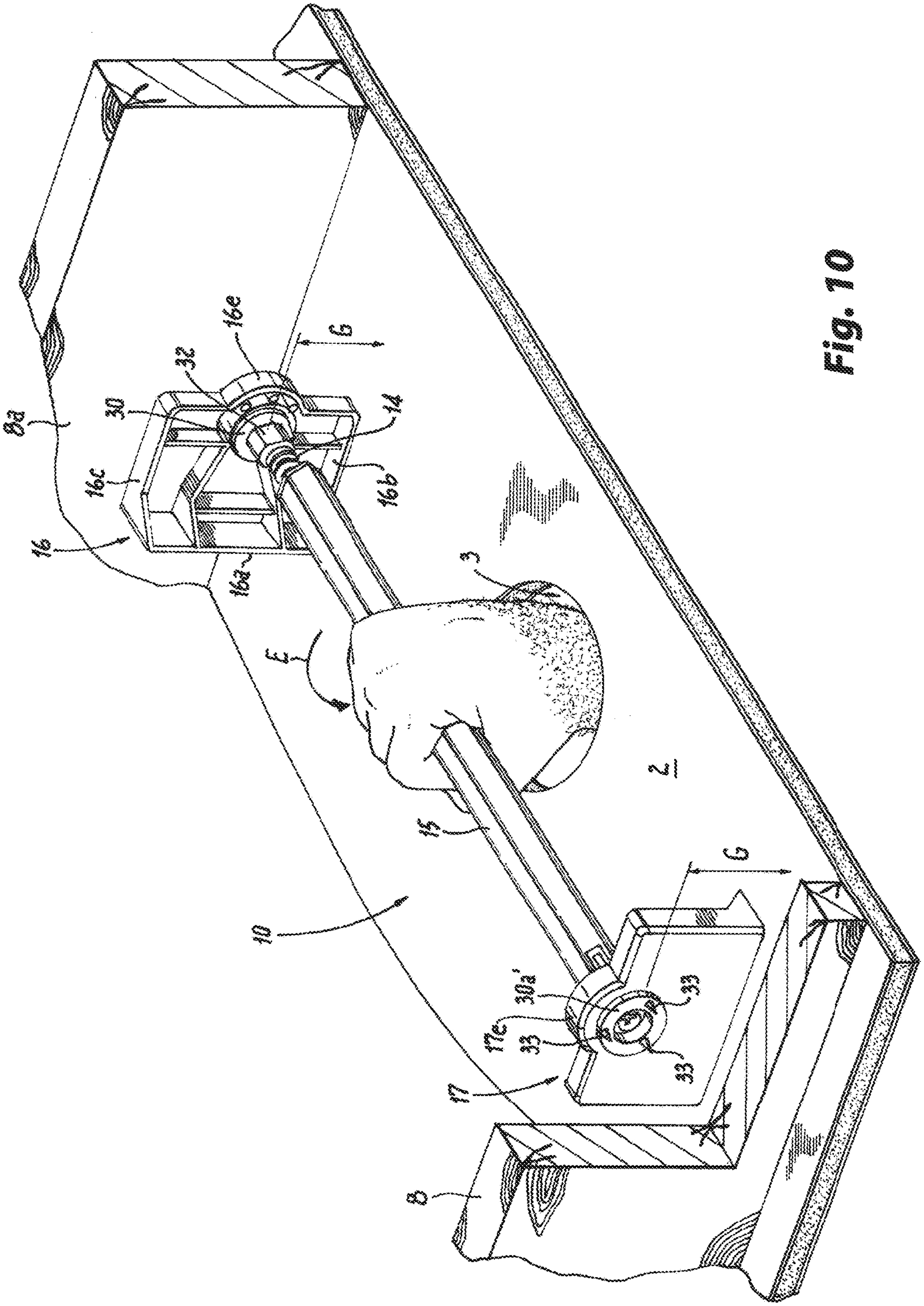
FIG. 10 is a perspective view showing that the bar brace can be accurately installed even if one of the mounting blocks topples over on its left-side engaging the backside of the ceiling, as opposed to the base of the mounting block. The arrows show that the length from the center of the threaded rod of the bar brace down to the backside of the ceiling in the same orientation is equal to the length from the center of the threaded rod on the opposite left or right-side of the end mounting block. Therefore, even if one or both end mounting blocks topples over, the horizontal level orientation of the threaded rod will be the same, as if the end mounting block was in its original upright position.

Therefore, after the optional use of the drill with reverse threading capability, shown in FIG. 8, to move the threaded rod 14 toward the distal end mounting block 16, as shown in FIG. 10, the adjustable bar brace 10 and its components are lifted manually through the ceiling hole 3, preferably, but not limited to, 4 inches in diameter, as noted herein in the description of FIG. 3 herein.

Then, in the space above the preexisting SHEETROCK® or ceiling panel 2, the adjustable bar brace 10 is manually leveled horizontally in place by the installer, above the preexisting SHEETROCK® or ceiling panel 2.

As shown in FIG. 10, even if one or both of the mounting blocks 16 or 17 has toppled 90 degrees on its side, the threaded rod 14 and insert 40 within the polygonal tube sleeve 15 are maintained horizontally and level in place within the distal end mounting block 16. The level movement of the threaded rod 14 within the insert 40 occurs because the receptacles in the mounting block 16 are centrally positioned, so that the threaded rod 14 can advance within the receptacle 32 in the end plate 30 of the mounting block 16, no matter whether the distal, right-side mounting block 16 has toppled 90 degrees on its side or not.

As also shown in FIGS. 3 and 6-11, the round end plate 30 penetrating on both sides of end mounting block 16, includes the above noted distal disk collar 30*a* and a further disk collar 30*b* on the proximal side of the mounting block 16 with protruding stakes/spikes 33 located on the distal side of the mounting block 16. The front disk collar 30*a* of the round plate 30 also includes an inwardly extending tubular sleeve 32, into which the threaded rod 14 is inserted in place.

Figure 11:
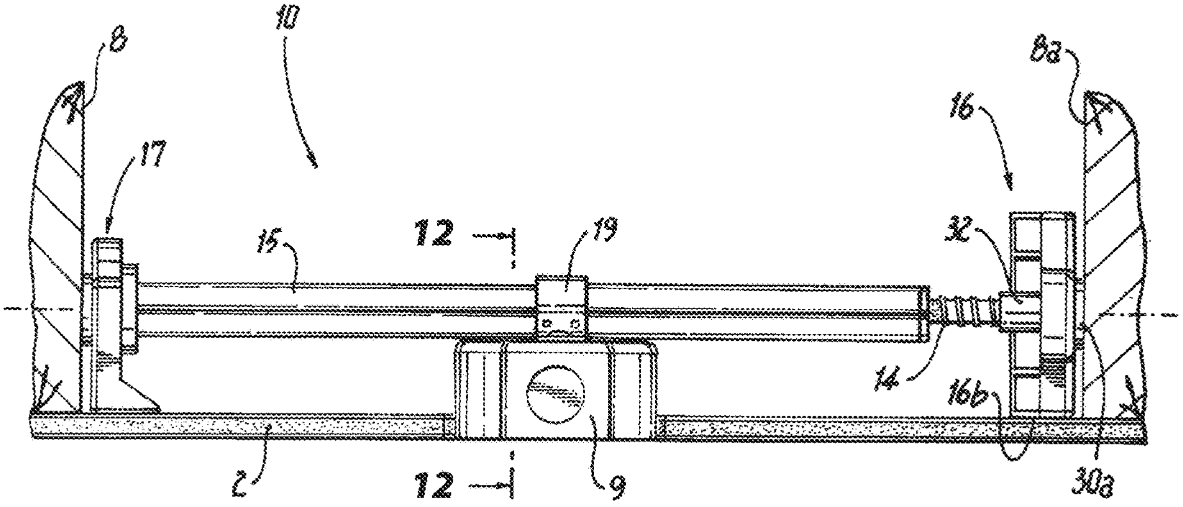
FIG. 11 is a front elevation view of the bar brace installed as in FIG. 10 with the left-mounting block having the bottom base contacting the backside of the ceiling but with the right-mounting block being oriented at 90 degrees so that a side of the right-mounting block contacts the backside of the ceiling at the same distance as the distance of the left-mounting block.

As shown in FIG. 6, FIG. 9, and FIG. 10, should the mounting blocks 16 or 17 somehow roll over, the dimension lines "G", representing the linear distance from the middle of the threaded rod 14 to the bottom of the mounting blocks 16 or 17 are equal to the distance "G" from the middle of the threaded rod 14 to the left- or right-sides of the mounting blocks 16 or 17, so that if the mounting blocks 16 and or 17 are toppled over after the user contacts an obstruction in the ceiling (such as insulation, electrical wiring, or other objects), this will result in the horizontal level installation of the mounting blocks 16 or 17, of FIG. 11 despite the rolling over and toppling of the mounting blocks 16 or 17.

As shown in FIG. 3, after being placed above the preexisting SHEETROCK® or ceiling panel 2 through hole 3, preferably, but not limited to, 4 inches in diameter, the threaded rod 14 is advanced in the ceiling by the installer following the directional indicial 50, and turning the polygonal tube sleeve 15, with insert 40 and threaded rod 14. Therefore, the threaded rod 14 advances distally into the round sleeve 32 of the round circular plate 30 of the distal end mounting block 16. Consequently, the adjustable bar brace 10 with the threaded rod 14, insert 40, within the polygonal tube sleeve 15, after being inserted manually by the installer through the hole 3, preferably, but not limited to, 4 inches in diameter, within the preexisting SHEETROCK® or ceiling panel 2, leveling of the adjustable bar brace 10 occurs. The adjustable bar brace 10 therefore includes the leveled mounting threaded rod 14 within insert 40, which itself is located in a "friction fit" within the polygonal sleeve tube 15, and extends between the two opposite mounting blocks 16 and 17, to be installed in place.

After the adjustable bar brace 10 and its components are inserted through the hole 3, preferably, but not limited to, 4 inches in diameter, of the preexisting SHEETROCK® or ceiling panel 2, as shown in FIG. 8, the installer mounts the opposite mounting blocks 16 and 17 on backside of the preexisting SHEETROCK® or ceiling panel 2, between wooden studs 8 and 8*a*.

As shown in FIG. 3, the left-side proximal end mounting block 17 is first attached by the pointed stakes/spikes 33 into a stud 8 to secure it in place. In order to mount the opposite distal mounting block 16 in place into the opposite stud 8*a*, the movement forward of the threaded rod 14 toward the other second end mounting block 16 occurs at the distal end of the threaded mounting rod 14, wherein after end mounting block's stakes/spikes 33 engage distal stud 8*a*, the adjustable bar brace 10 is ready for level installation above the preexisting SHEETROCK® or ceiling panel 2.

In summary, after being located level and horizontally in place above the preexisting SHEETROCK® or ceiling panel 2, one distal side of the hexagonal sleeve tube 15 having threaded rod 14 threadably inserted in "friction fit" threaded insert 40, is inserted into the distal mounting block 16 shown in FIG. 3. Distal end mounting block 16 includes a first circular plate 30 on the exterior outer side of the distal mounting block 16, which also has the pointed stakes/spikes 33 on that outer side, to immediately push into and secure the adjustable bar brace 10 with the threaded rod to the distal stud 8*a*, similar to how the opposite proximal mounting block also has stakes/spikes 33 inserted to the proximal opposite stud 8.

The opposite end mounting blocks 16 and 17 are uniquely configured for stability with perpendicular sides 16*b*, 16*c*, and 17*b*, 17*c*, top portions 16*d*, 17*d* and bottom base portions 16*a* and 17*a* thereof, so that if the end mounting block 16 or 17 is inadvertently toppled at 90 degrees, perpendicular to the bottom base 16*a* or 17*a* of the mounting block 16 or 17, the left-side 16*c* or 17*c*, or the right-side 16*b* or 17*b* of the end mounting blocks 16 or 17 will maintain the proper horizontal orientation of the ceiling fan/fixture box and adjustable brace 10 and it's ceiling fan/fixture box 9 supported therefrom, so that the threaded rod 14 and saddle brace 19, holding the ceiling fan/fixture box 9, will remain horizontal and level, therefore prevent any deviation of the ceiling fan adjustable bar brace 10 and mounting box 9 off of their proper horizontal level orientation.

As also shown in FIG. 10, it is noted that the top edge 16*d* of distal end mounting block 16 includes a centrally located rounded arcuate mid portion 16*e* to accommodate the distal round plate 30 with its large rounded top portion 30*a* having the pointed stakes/spikes 33 engaging into stud 8*a* to stabilize the distal end of the ceiling fan/fixture box and adjustable brace 10 in place. Likewise, the top edge of opposite proximal end mounting plate 17 also a centrally located rounded arcuate mid portion 17*e* to accommodate the distal round plate 30*a'* with its large rounded top portion, having the pointed stakes/spikes 33 engaging into stud 8*a* to stabilize the distal end of ceiling fan/fixture box and adjustable brace 10 in place.

FIG. 3 also shows the mounting block 16 right-side where the round plate 30 in which the threaded rod 14 is engaged, includes a tubular reciprocal threaded sleeve 32 mating with the threads of the threaded rod 14, on one inner-facing side of the mounting block 16, and a larger diameter round distal plate 30*a* (shown in FIGS. 7 and 8), on the other outer-stud-facing side of the mounting block 16 which includes protruding stakes/spikes 33 which will properly engage a respective stud 8*a* (as shown in FIG. 9) above the preexisting SHEETROCK® or ceiling panel 2 to fix the threaded rod 14 securely and horizontally level in place, where the ceiling fan/fixture box 9 descends directly vertically down through the round hole 3, preferably, but not limited to, 4 inches in diameter, in the preexisting SHEETROCK® or ceiling panel 2 (as shown in FIG. 9 and FIG. 10), so that the ceiling fan/fixture box 9 will be properly oriented in a vertical position below the threaded rod 14.

FIG. 4 shows the underside of the saddle brace 19 which has top 19*a*', right 19*b*' and left 19*c*' interior surfaces which engage the top 15*a*, right 15*b* and left 15*c* exterior surfaces of the polygonal bar brace sleeve 15 of FIG. 3, wherein the lock nuts 21 and 22 are shown descending from opposite horizontal wings 19*d* and 19*e* of the saddle brace 19 before insertion into the receptacles located in the backside of the ceiling fan electrical box 9 being supported by the adjustable bar brace 10 of the present invention.

FIG. 5 is shows a close up cross sectional view, taken along view lines 5-5 of FIG. 3, of the hexagonal bar brace sleeve 15 of FIG. 3, showing also in cross section the “friction-fit” polygonal insert 40 located inside the bar brace sleeve tube 15, where the threaded rod 14 is used to maintain the ceiling fan/fixture box and adjustable brace 10 in a horizontal orientation above the preexisting SHEETROCK® or ceiling panel 2.

Figure 12:
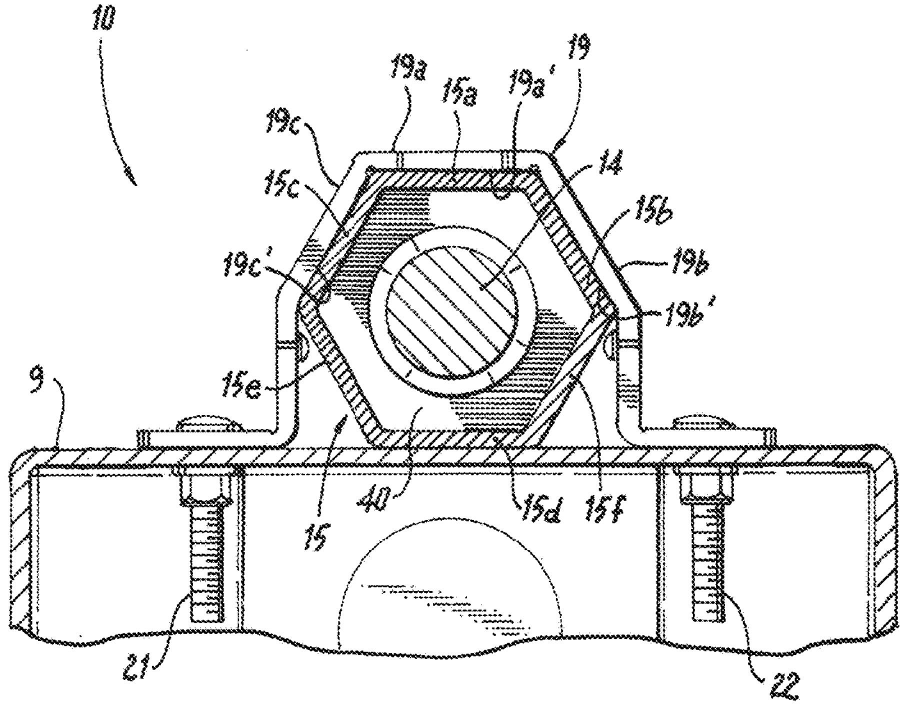

FIG. 5 also shows the cross hatched area of a metal or plastic insert 40 which surrounds the threaded rod 14 within the confines of the polygonal tubular sleeve 15 in a “friction fit” attachment. FIGS. 8 and 12 also show the threaded rod 14 within the insert 40 inside of the polygonal tubular sleeve 15, which is attached to the ceiling mounting box 9 by the saddle brace 19 attached by lock nuts 21 and 22 through holes 9*a* and 9*b* in the top of the ceiling box 9. While one hole 9*a* is round, the other hole 9*b* is preferably oblong, so that the lock nuts 21 and 22 can be inserted, without having to have exact matching of the lock nuts 21 or 22 into holes 9*a* and 9*b* of the ceiling mounting box 9.

FIG. 6 shows the left-mounting block 17 shown in position on the backside of the preexisting SHEETROCK® or ceiling panel 2 where the hexagonal sleeve 15 of the adjustable bar brace 10 engages the left-mounting block 17 by the threaded inner rod 14 of the adjustable bar brace 10, threadably engaging opposite threads in the left-mounting block 17. The arrow lines “G” shown depict the equal distance between the left 17*c*, bottom 17*a* and right 17*c* sides of the left-mounting block 17, demonstrating that the hexagonal sleeve tube 15 will always be entering level the left or right-mounting blocks 16 or 17 no matter whether the mounting block 16 or 17 is standing upright on its bottom base 16*a* or 17*a*, or standing on either of its left 16*c* or 17*c* and right 16*b* or 17*b* side edges of the mounting block 16 or 17, so that the ceiling fan/fixture box and adjustable brace 10 is always oriented horizontally, no matter whether one of the mounting blocks 16 or 17 is standing on its bottom edge 16*a* or 17*a*, or is standing on its perpendicular side edge 16*b*, 16*c*, or 17*b*, 17*c*.

FIG. 7 shows a front elevation view of the right-mounting block 16 showing the threaded rod 14 inserted into the receptacle 32 of the right-mounting block 16, as the threaded rod 14 extends beyond the hexagonal sleeve 15 of the adjustable bar brace 10. Instructional indicia 50 are shown with turning directional arrows and the word “TURN” showing the direction of turning the threaded end of the threaded rod 14 into the right-mounting block 16.

FIG. 7 also shows the mounting block 16 in a side view where the round plate 30 in which the threaded rod 14 is engaged includes a tubular reciprocal threaded sleeve 32 mating with the threads of the threaded rod 14, on one inner-facing side of the mounting polygonal sleeve tube 15, and a larger diameter round distal plate 30*a*, on the other outer-stud-facing side of the mounting block 16 which includes protruding stakes/spikes 33 which will properly engage a respective stud 8*a* above the preexisting SHEETROCK® or ceiling panel 2 to fix the threaded rod 14 securely and horizontally level in place, where the ceiling fan/fixture box 9 descends directly vertically down through the round hole 3, preferably, but not limited to, 4 inches in diameter, in the ceiling 2 so that the ceiling fan/fixture box 9 will be properly oriented in a vertical level position below the threaded rod 14. While FIG. 7 shows the right-side mounting block 16 in a side view, it is assumed that the left-side mounting block 17 could be a mirror image of the right-side mounting block 16.

Figure 5A:
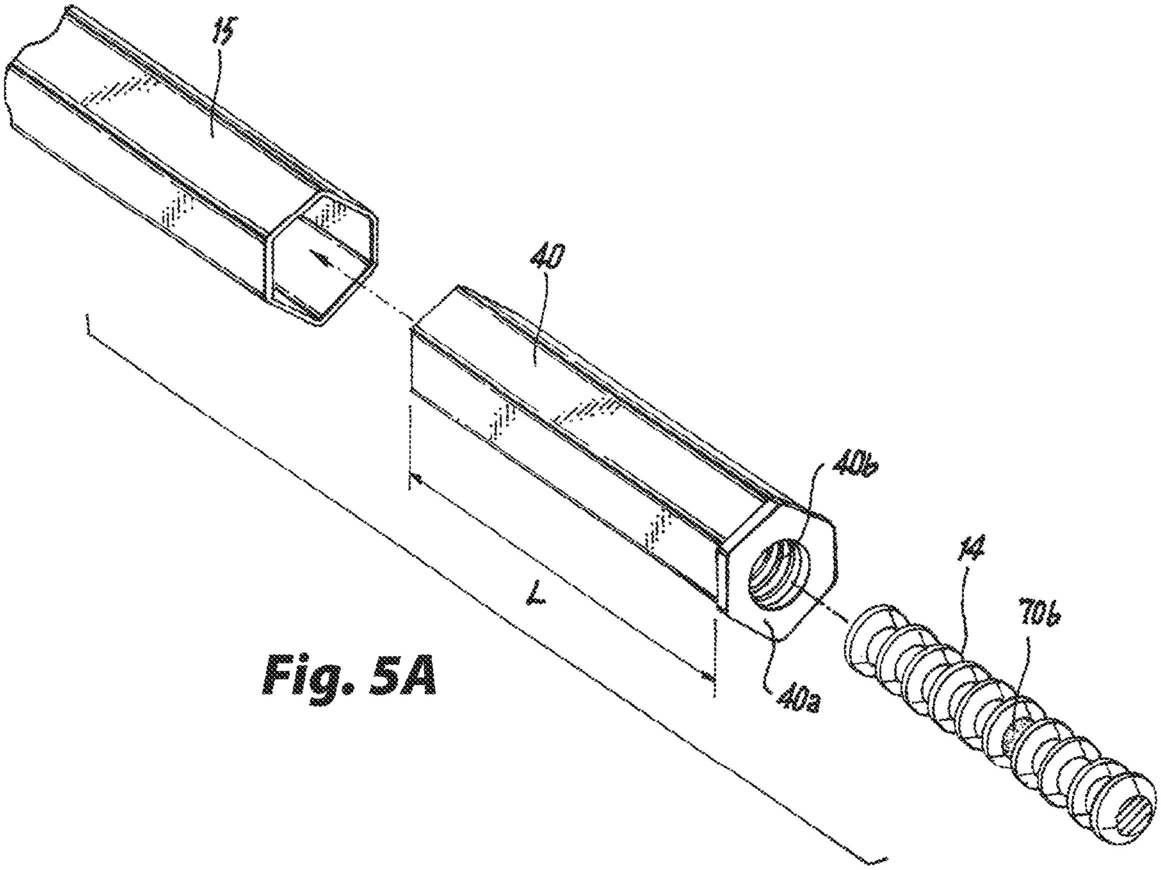
FIGS. 5A and 5B show the cross hatched area of a metal or plastic insert of FIG. 5, which surrounds the threaded rod within the confines of the polygonal tubular sleeve in a "friction fit" attachment.
Figure 5B:
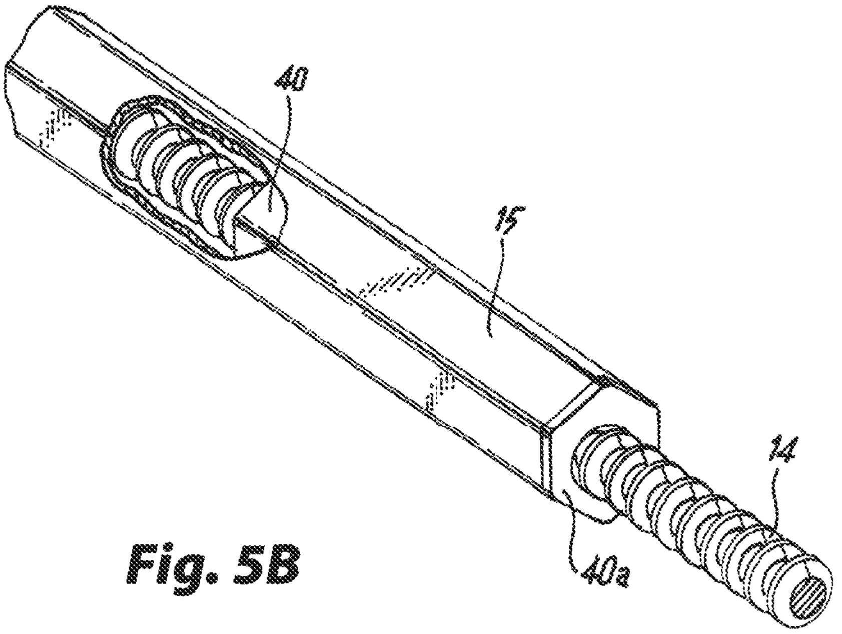

As also shown in FIGS. 5A and 7, the threaded rod 14 has an optional distal paint or otherwise designated mark 70*a* (see FIG. 7), and a proximal paint mark 70*b* (see FIG. 5A) which warns the installer that the threaded rod 14 is reaching its limit of travel within the threaded insert 40 risks pull out from the insert 40. The distal paint mark 70*a* (shown in FIG. 7) and the proximal paint mark 70*b* (shown in FIG. 5A) denotes the safe limit of the threaded rod 14 extension.

Besides showing the optional use of drill 60 to advance the threaded rod 14 in a distal direction toward end mounting block 16, FIG. 8 also shows a right-side portion of the ceiling fan/fixture box and adjustable brace 10, before it is installed through the ceiling hole 3, preferably, but not limited to, 4 inches in diameter, in the preexisting SHEETROCK® or ceiling panel 2, as shown in drawing FIG. 9. In order to grip the opposite studs 8 and 8*a* (see FIGS. 9 and 10) above the preexisting SHEETROCK® or ceiling panel 2, the distal opposite ends of the fan/fixture box 9 and adjustable brace 10 with its protruding stakes/spikes 33 at each opposite end, must be measured so that the threaded rod 14 underneath the saddle brace 19 can engage the opposite studs 8 and 8*a* (see FIGS. 9 and 10) between which the ceiling fan/fixture box and adjustable brace 10 is to be secured in place. Therefore, the ends of the threaded rod 14 are engageable within the opposite proximal end mounting blocks 16, having a round plate 30 and having threaded rod 14 insertion sleeve 32 for insertion of the distal end of threaded rod 14, with reverse threads engageable with the threads of threaded rod 14.

After the manual installation of the ceiling fan/fixture box and adjustable brace 10 and its components through the ceiling hole 3, preferably, but not limited to, 4 inches in diameter, FIGS. 3 and 9-12 show the manually leveled horizontally located adjustable bar brace 10 with opposite end mounting blocks 16 and 17, each having protruding stakes/spikes 33 on the round rear plate 30*a* of rear plate 30 so that the protruding stakes/spikes 33, which are on the outside surfaces 30*a* of the round plate 30, located at the opposite sides of the end mounting blocks 16 and 17 of the ceiling fan/fixture box and adjustable brace 10, will securely protrude into the respective studs 6 and 6*a* extending above the preexisting SHEETROCK® or ceiling panel 2, so that the ceiling fan/fixture box and adjustable brace 10 is firmly held between two opposite studs 8 and 8*a* extending above the preexisting SHEETROCK® or ceiling panel 2.

FIG. 9 shows a user's hand extending through the circular hole 3, preferably, but not limited to, 4 inches in diameter, in the preexisting SHEETROCK® or ceiling panel 2 and rotating the polygonal outer sleeve tube 15 and threaded rod 14 of the ceiling fan/fixture box and adjustable brace 10 therein, as indicated by the forward rotational curved arrow "E", so that the threaded rod 14 within the hexagonal sleeve 15 of the ceiling fan/fixture box and adjustable brace 10 engages the left and right-mounting blocks 16 and 17 located on the backside of the preexisting SHEETROCK® or ceiling panel 2 to support the ceiling fan at that location. FIG. 9 also shows the pair of studs 8 and 8*a* spaced apart from each other at a distance exceeding the length of the ceiling fan/fixture box and adjustable brace 10, so that the ceiling fan/fixture box and adjustable brace 10 is expanded in length and installed spaced apart from the pair of studs 8 and 8*a* shown.

FIG. 10 shows that the ceiling fan/fixture box and adjustable brace 10 can be accurately installed in a horizontal level orientation even if one of the mounting blocks 16 or 17 happens to topple over 90 degrees and be installed on its left-side 16*b* engaging the backside of the ceiling 2, as opposed to the base 16*a* of the mounting block 16.

The curved arrow "E" indicates the installer's rotational forward turning of the polygonal sleeve tube 15 with threaded rod 14 therein. The pair of linear arrow lines "G" in FIG. 10 show that the length from the center of the threaded rod 14 of the ceiling fan/fixture box and adjustable brace 10, down to the backside of the preexisting SHEETROCK® or ceiling panel 2 with side mounting block 17 in the same orientation as side mounting block 16 in FIG. 9, is equal to the length from the center of the threaded rod 14, down to backside of the preexisting SHEETROCK® or ceiling panel 2, to side mounting block 16 on the opposite side of the ceiling fan/fixture box and adjustable brace 10, even if side mounting block 16 is toppled over by 90 degrees, so that the side 16*b* of side mounting block 16 is actually the bottom touching surface of side mounting block 16, when the bottom 16*a* is actually on the left-side of side mounting block 16, after toppling by contact with insulation or other obstructions above the preexisting SHEETROCK® or ceiling panel 2.

FIG. 11 shows the ceiling fan/fixture box and adjustable brace 10 installed as in FIG. 10 with the left-mounting block 17 having its bottom base 17*a* contacting the backside of the preexisting SHEETROCK® or ceiling panel 2, but with the right-mounting block 16 being oriented at 90 degrees after toppling, so that the side 16*b* of the right-mounting block 16 contacts the backside of the preexisting SHEETROCK® or ceiling panel 2 at the same distance as the distance of the left-mounting block 17. Consequently, the threaded rod 14 and its polygonal outer sleeve tube 15 is perfectly level and parallel to the level of the preexisting SHEETROCK® or ceiling panel 2, wherein the ceiling fan/fixture box 9 is perfectly aligned in a vertical downward orientation to support the ceiling fan and related lighting components in the same proper orientation below the preexisting SHEETROCK® or ceiling panel 2.

FIG. 12 shows in cross-section the installed mounting ceiling fan/fixture box and adjustable brace 10 shown in FIG. 9 with the hexagonal sleeve 15 of the ceiling fan/fixture box and adjustable brace 10 holding the centrally located threaded rod 14 therein, and wherein the interior top 19*a*, left-side 19*c* and right-side 19*b* of the saddle brace 19 include interior surfaces 19*a*', 19*b*' and 19*c*' which grasp the hexagonal top half with surfaces 15*a*, 15*b* and 15*c* of the hexagonal sleeve 15 of the ceiling fan/fixture box and adjustable brace 10, wherein the lock nuts 21 and 22 engage through the backside of the ceiling fan electrical mounting box 9 to stabilize it in place when the ceiling fan electrical mounting box 9 of FIG. 3 is mounted in place within the ceiling 2, for supporting an electrical fan and related lighting components therefrom.

While illustrative implementations of one or more embodiments of the disclosed system are provided hereinabove, those skilled in the art and having the benefit of the present disclosure will appreciate that further embodiments may be implemented with various changes within the scope of the disclosed system. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

I claim:

1. A stable fan/fixture box and adjustable brace for ceiling fan electrical boxes in old work environments where a said fan/fixture box must be mounted and stabilized above the backside of the ceiling, and where only a small hole can be made in the preexisting drywall or ceiling panel in order for an installer to carry and insert the fan/fixture box and adjustable brace into the small hole, without any visual access to the area above the preexisting drywall or ceiling panel, comprising:

- a pair of studs being provided for inserting said fan/fixture box therebetween;
- said fan/fixture box supported by an adjustable brace wherein said fan/fixture box is mounted and extends through a hole in a vertical downward direction;
- said fan/fixture box and adjustable brace having a threaded rod, said threaded rod being expandable by turning, so that said threaded rod moves between adjacent studs above the preexisting drywall or ceiling panel;
- said threaded rod being supported within a solid insert having a threaded hole therewithin, said solid insert frictionally fit within an outer polygonal sleeve tube;
- said threaded rod, said insert and said polygonal sleeve tube being supported by opposite mounting blocks;
- said mounting blocks being rectangular and having perpendicular walls, wherein if one of said mounting blocks falls over on one side, said fan/fixture box and adjustable brace will still remain level and horizontal when moved by the installer's hand reaching up into the dark hole above the preexisting drywall or ceiling panel;
- said mounting blocks on each side of said threaded rod and polygonal sleeve tube, each having one or more pointed stakes/spikes capable of affixing said fan/fixture box and adjustable brace to each respective stud within the ceiling when said threaded rod is threadably moved toward said studs to form a tight fit there between;
- said fan/fixture box being mounted and installed in a horizontal level orientation parallel to the preexisting drywall or ceiling panel, while said fan/fixture box extends downward to hold heavy components of a ceiling fan and associated lighting;
- said mounting blocks each having a round plate extending in which a distal end of said threaded rod is engaged, within a tubular reciprocal threaded sleeve of said round plate, mating with respective threads of said threaded rod, on one inner-facing side of said mounting block; and said round plate further having a larger diameter round distal plate, on the other outer-stud-facing side of said mounting block, said larger diameter round distal plate having said protruding stakes/spikes engageable with a respective stud above the preexisting drywall or ceiling panel to fix said adjustable brace with said threaded rod securely and horizontally level in place, where said fan/fixture box descends directly vertically down through the round hole in the preexisting drywall or ceiling panel, wherein the fan/fixture box is oriented in a vertical position below said threaded rod.

2. The stable fan/fixture box and adjustable brace for ceiling fan electrical boxes in old work environments as in claim 1 further comprising said rectangular opposite end mounting blocks being configured with four sides, where the normally bottom edge has a predetermined fixed distance from a midpoint of a hole for said level threaded rod, which said predetermined fixed distance is equal to the distance from the left and right-side edges, also in an equal distance from the hole for a level threaded rod, so that if one end mounting block topples over on its side edge, the threaded rod will remain level and horizontal above the backside of the preexisting drywall or ceiling panel.

3. The stable fan/fixture box and adjustable brace for ceiling fan electrical boxes in old work environments as in claim 2 further comprising at respective opposite ends of said mounting blocks there are provided respective left and right end plates with pointed stakes/spikes engageable with respective smooth sides of the studs on either side of the hole in the preexisting drywall or ceiling panel.

4. The stable fan/fixture box and adjustable brace for ceiling fan electrical boxes in old work environments as in claim 2 wherein said adjustable brace is advanced toward said respective mounting end mounting blocks, as the installer turns said threaded rod within said polygonal sleeve tube so that said pointed stakes/spikes on either side of said mounting blocks point into the studs on either side of said mounting blocks.

5. The stable fan/fixture box as in claim 1 wherein solid insert having a threaded hole therewithin, frictionally fit within an outer polygonal sleeve tube, wherein said frictionally fit solid insert is at least about four inches in length to support said threaded rod within said outer sleeve of said adjustable brace.

6. The stable fan/fixture box and adjustable brace for ceiling fan electrical boxes in old work environments as in claim 1 wherein said polygonal sleeve tube is hexagonal in shape and said "friction fit" insert is hexagonal in shape.

7. The stable fan/fixture box and adjustable brace for ceiling fan electrical boxes in old work environments as in claim 1 wherein said polygonal sleeve tube is attached to said fan/fixture box by a saddle brace having a top and inner side surfaces which conform in shape to the respective top and outer side polygonal surfaces of said polygonal sleeve tube, said saddle brace having opposite horizontal flanges having holes for insertion of said screw fasteners through each said flange and then into said fan/fixture box, said fan/fixture box being fastened in place securely to said saddle brace and therefore also to said polygonal tube sleeve having said threaded rod threadably in place therein.

8. The stable fan/fixture box and adjustable brace for ceiling fan electrical boxes in old work environments as in claim 1 further comprising said polygonal tube sleeve being insertable within the hole in the preexisting drywall or ceiling panel and configured to be grasped by the installer and rotated manually to advance said threaded rod and said distal end mounting block toward a distal stud, wherein when said proximal end mounting block is in contact with a proximal, opposite facing stud.

9. The stable fan/fixture box and adjustable brace for ceiling fan electrical boxes in old work environments as in claim 1 further comprising said fan/fixture box and adjustable brace supports a ceiling fan horizontally level below the preexisting drywall or ceiling panel with said mounting box for the ceiling fan and lighting components extending downward in a vertical orientation below a backside of said preexisting drywall or ceiling panel.

10. The stable fan/fixture box and adjustable brace as in claim 1, further comprising visual indicia indicating the direction of turning said polygonal sleeve tube.

11. The stable fan/fixture box and adjustable brace for ceiling fan electrical boxes in old work environments as in claim 1, further comprising: a crisscrossed recess in an end of said round plate, said crisscrossed recess configured to receive a bit of a drill before said threaded rod is inserted into the ceiling, wherein said mounting blocks are thereby configured to be moved by using the drill and bit to cause rotational movement of said threaded rod.

12. The stable fan/fixture box and adjustable brace as in claim 1, wherein said threaded rod has visual indicia indicating the limits of moving said threaded rod within said insert.

13. A stable fan/fixture box and adjustable brace for ceiling fan electrical boxes in old work environments where a said fan/fixture box must be mounted and stabilized above the backside of the ceiling between a pair of adjacent ceiling studs, and where only a small hole can be made in the preexisting drywall or ceiling panel in order for an installer to carry and insert the fan/fixture box and adjustable brace into the small hole, without any visual access to the area above the preexisting drywall or ceiling panel, comprising:

said fan/fixture box supported by an adjustable brace wherein said fan/fixture box is mounted and extends through a hole in a vertical downward direction;

said fan/fixture box and adjustable brace having a threaded rod, said threaded rod being expandable by turning, so that said threaded rod moves between the adjacent ceiling studs above the preexisting drywall or ceiling panel;

said threaded rod being supported within a solid insert having a threaded hole therewithin, said solid insert frictionally fit within an outer polygonal sleeve tube;

said threaded rod, said insert and said polygonal sleeve tube being supported by opposite mounting blocks;

said mounting blocks being rectangular and having perpendicular walls, wherein if one of said mounting blocks falls over on one side, said fan/fixture box and adjustable brace will still remain level and horizontal when moved by the installer's hand reaching up into the dark hole above the preexisting drywall or ceiling panel;

said mounting blocks on each side of said threaded rod and polygonal sleeve tube, each having one or more pointed stakes/spikes capable of affixing said fan/fixture box and adjustable brace to each of the respective ceiling studs when said threaded rod is threadably rotated to form a tight fit there between;

said fan/fixture box being mounted and installed in a horizontal level orientation parallel to the preexisting drywall or ceiling panel, while said fan/fixture box extends downward to hold heavy components of a ceiling fan and associated lighting;

said mounting blocks each having a round plate extending in which a distal end of said threaded rod is engaged, within a tubular reciprocal threaded sleeve of said round plate, mating with respective threads of said threaded rod, on one inner-facing side of said mounting block; and said round plate further having a larger diameter round distal plate, on the other outer-stud-facing side of said mounting block, said larger diameter round distal plate having said protruding stakes/spikes engageable with a respective one of the adjacent ceiling studs to fix said adjustable brace with said threaded rod securely and horizontally level in place, where said fan/fixture box descends directly vertically down through the round hole in the preexisting drywall or ceiling panel, wherein the fan/fixture box is oriented in a vertical position below said threaded rod.

* * * * *